United States Patent
Ito et al.

(10) Patent No.: US 9,157,379 B2
(45) Date of Patent: Oct. 13, 2015

(54) VARIABLE VALVE TIMING CONTROL DEVICE FOR INTERNAL COMBUSTION ENGINE

(71) Applicant: NISSAN MOTOR CO., LTD., Yokohama-shi, Kanagawa (JP)

(72) Inventors: Hironori Ito, Ebina (JP); Hiroyuki Itoyama, Yokohama (JP); Kenji Ariga, Fujisawa (JP); Ken Shiozawa, Yamato (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/377,682

(22) PCT Filed: Mar. 7, 2013

(86) PCT No.: PCT/JP2013/056312
§ 371 (c)(1),
(2) Date: Aug. 8, 2014

(87) PCT Pub. No.: WO2013/133379
PCT Pub. Date: Sep. 12, 2013

(65) Prior Publication Data
US 2015/0013626 A1    Jan. 15, 2015

(30) Foreign Application Priority Data
Mar. 8, 2012 (JP) .................... 2012-051347

(51) Int. Cl.
*F01L 1/34* (2006.01)
*F02D 13/02* (2006.01)
*F01L 1/344* (2006.01)

(52) U.S. Cl.
CPC .............. *F02D 13/02* (2013.01); *F01L 1/3442* (2013.01); *F02D 13/0238* (2013.01); *F01L 2001/34426* (2013.01); *F01L 2001/34466* (2013.01); *F01L 2001/34473* (2013.01); *F02D 13/0219* (2013.01); *F02D 2013/0292* (2013.01); *Y02T 10/18* (2013.01)

(58) Field of Classification Search
CPC .................... F01L 1/3442; F01L 2001/34426; F01L 2001/34466; F01L 2001/34473; F02D 13/0238; F02D 13/02; F02D 2013/0292; F02D 13/0219
USPC ............................................ 123/90.15, 90.17
See application file for complete search history.

(56) References Cited

U.S. PATENT DOCUMENTS
6,330,870 B1 * 12/2001 Inoue et al. ................ 123/90.17

FOREIGN PATENT DOCUMENTS
JP    2002-122009 A    4/2002
JP    2004-225710 A    8/2004
(Continued)

OTHER PUBLICATIONS
Brief Description of Japanese Patent Application No. 2012-016103 (not yet published).

*Primary Examiner* — Zelalem Eshete
(74) *Attorney, Agent, or Firm* — Drinker Biddle & Reath LLP

(57) ABSTRACT

Intermediate position feedback control is executed when valve timing of an intake valve is at an intermediate lock position, an intermediate lock is needed, and an engine revolution speed is greater than a first engine revolution speed R1. Forced lock control is executed when the valve timing of the intake valve is at the intermediate lock position, the intermediate lock is needed, the engine revolution speed is less than the first engine revolution speed R1, and the intermediate position feedback control is not being executed. As a result, even when the engine revolution speed increases in the presence of a demand that the valve timing needs to be in the intermediate lock position, it is possible to maintain the valve timing at the intermediate lock position.

9 Claims, 6 Drawing Sheets

(56) References Cited

FOREIGN PATENT DOCUMENTS

| | | |
|---|---|---|
| JP | 2005-016445 A | 1/2005 |
| JP | 2009-215968 A | 9/2009 |
| JP | 2010-059979 A | 3/2010 |
| JP | 2010-138698 A | 6/2010 |
| JP | 2011-226452 A | 11/2011 |

* cited by examiner

VARIABLE VALVE TIMING CONTROL DEVICE FOR INTERNAL COMBUSTION ENGINE

TECHNICAL FIELD

The present invention relates to a variable valve timing control device for an internal combustion engine.

BACKGROUND ART

Patent document 1 discloses a variable valve timing device of an internal combustion engine, which is provided with an intermediate lock mechanism that enables a phase of a camshaft relative to a crankshaft to be locked at an intermediate phase.

The intermediate lock mechanism, disclosed in the Patent document 1, has a housing configured to rotate in synchronism with the crankshaft, vanes installed in the housing and configured to rotate together with the camshaft, and a lock pin configured to extend along the direction perpendicular to the camshaft. The intermediate lock mechanism is configured to restrict relative rotation of the camshaft with respect to the crankshaft and hold valve timing at a predetermined intermediate lock position, by inserting the lock pin from the camshaft side into a lock hole formed in the housing.

However, when an engine revolution speed increases and thus a centrifugal force, acting on the lock pin, also increases, there is a possibility that valve timing may not be held at the intermediate lock position by the use of the intermediate lock mechanism.

It is, therefore, in view of the previously-described drawbacks of the prior art, an object of the invention to provide a variable valve timing control device for an internal combustion engine capable of maintaining valve timing at an intermediate lock position even under an operating condition that the valve timing cannot be held at the intermediate lock position by the use of an intermediate lock mechanism owing to an engine revolution speed increase.

CITATION LIST

Patent Literature

Patent document 1: Japanese Patent Provisional Publication No. 2005-016445

SUMMARY OF INVENTION

A variable valve timing control device for an internal combustion engine according to the invention is equipped with a variable valve timing mechanism configured to change valve timing of an engine valve, and an intermediate lock mechanism having an intermediate-position holding member configured to advance or retreat in a direction perpendicular to a rotation axis common to a first rotor and a second rotor of the variable valve timing mechanism and enable the valve timing of the engine valve to be held at a predetermined intermediate lock position between a maximum phase-advance position and a maximum phase-retard position by engagement with the first rotor and the second rotor. The variable valve timing control device is characterized in that feedback control is executed such that the valve timing of the engine valve is brought to the intermediate lock position, when an engine revolution speed is greater than or equal to a first engine revolution speed even under a condition that permits the intermediate-position holding member to be engaged.

According to the invention, in the presence of a demand that the valve timing of an engine valve needs to be in a predetermined intermediate lock position, it is possible to hold the valve timing of the engine valve at the intermediate lock position even when an engine revolution speed increases.

DESCRIPTION OF EMBODIMENTS

Figure 1:
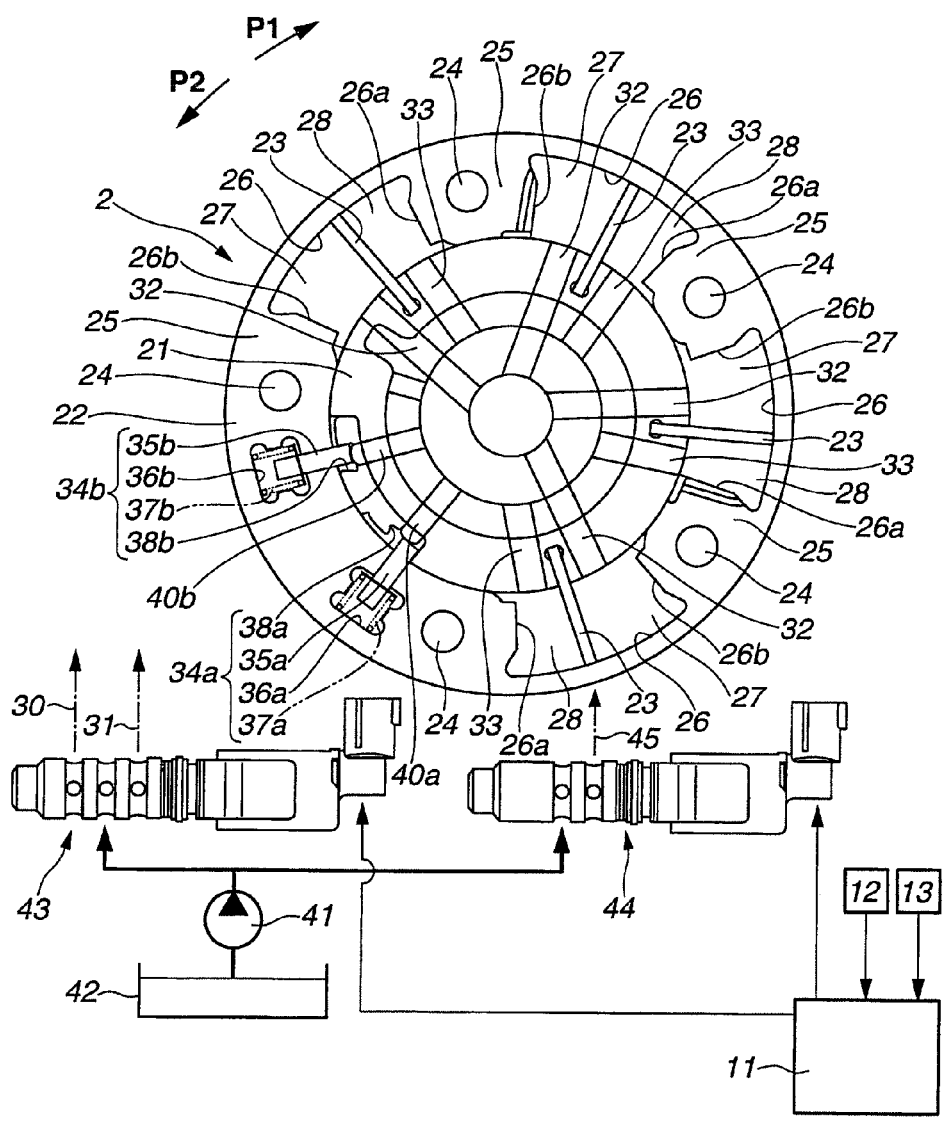
FIG. 1 is an explanatory view illustrating the schematic system configuration of a variable valve timing control device for an internal combustion engine according to the invention.

One embodiment of the invention is hereinafter described in reference to the drawings. FIG. 1 is the explanatory view illustrating the schematic system configuration of a variable valve timing control device for an internal combustion engine according to the invention. A variable valve timing mechanism 2 of this variable valve timing control device is configured to continuously variably control a rotational phase difference between a crankshaft (not shown) and a camshaft (not shown) by working-fluid supply, such that valve timing (a phase of the central angle of a valve lift) of an engine valve (not shown intake or exhaust valves) can be variably adjusted within a predetermined range. In the shown embodiment, the variable valve timing mechanism 2 is applied to the intake-valve side.

As shown in FIG. 1, variable valve timing mechanism 2 is equipped with an inner rotor 21 (a first rotor) and an outer rotor 22 (a second rotor) fitted to the inner rotor 21 in a manner so as to be relatively rotatable with respect to the inner rotor.

Inner rotor 21 is fixedly connected to the axial end of an intake camshaft (not shown) rotatably supported on a cylinder block (not shown) of the internal combustion engine, such that the inner rotor and the intake camshaft rotate integrally with each other. When the intake camshaft rotates together with the inner rotor 21, the intake valves are operated (opened and closed) by means of cams (not shown) attached onto the intake camshaft. Four vanes 23 are radially installed on the outer periphery of inner rotor 21.

Outer rotor 22 is coaxially arranged on the outer peripheral side of inner rotor 21. Outer rotor 22 is fixedly connected to an intake cam sprocket (not shown) by means of a plurality of mounting bolts 24. The intake cam sprocket is linked to the crankshaft through a timing chain (not shown) or a timing belt (not shown).

The inner periphery of outer rotor 22 is formed with protruding portions 25 having the same number (i.e., four) of vanes 23 of inner rotor 21. Vanes 23 are accommodated in respective recessed portions 26, defined by each two adjacent protruding portions 25.

The tip of each vane 23 is kept in sliding-contact with the inner periphery of the recessed portion 26, whereas the tip of each protruding portion 25 is kept in sliding-contact with the outer periphery of inner rotor 21. As a result of this, a group of the inner rotor 21 and the intake camshaft and a group of the intake cam sprocket and the outer rotor 22 are rotatable relatively to each other about the same central rotation axis.

Also, two spaces 27, 28, partitioned by the vane 23, are defined in the recessed portion 26 in a fluid-tight fashion. The space 28 of these two spaces 27-28, located on the side of the rotation direction (the direction indicated by the arrow P1) of the intake camshaft with respect to the vane 23, serves as a phase-retard side hydraulic chamber, whereas the space 27, located on the opposite side (the direction indicated by the arrow P2), serves as a phase-advance side hydraulic chamber.

Oil passages 32, each communicating with a phase-advance side oil passage 30, and oil passages 33, each communicating with a phase-retard side oil passage 31, are formed in the inner rotor 21.

In the shown embodiment, when a phase of outer rotor 22 relative to inner rotor 21 is advanced to a maximum in the direction indicated by the arrow P1 by working-fluid supply from the phase-advance side oil passage 30 to the phase-advance side hydraulic chamber 27, in other words, when the vane 23 is brought into abutted-engagement with one end face 26a of two opposed end faces of the recessed portion 26 or a stopper (not shown) located on the side of the end face 26a, valve timing of the intake valve becomes a maximum phase-advanced state. A valve-timing position of the intake valve under this state corresponds to a maximum phase-advance position. In contrast, when a phase of outer rotor 22 relative to inner rotor 21 is advanced to a maximum in the direction indicated by the arrow P2 by working-fluid supply from the phase-retard side oil passage 31 to the phase-retard side hydraulic chamber 28, in other words, when the vane 23 is brought into abutted-engagement with the other end face 26b of the two opposed end faces of the recessed portion 26 or a stopper (not shown) located on the side of the end face 26b, valve timing of the intake valve becomes a maximum phase-retarded state. A valve-timing position of the intake valve under this state corresponds to a maximum phase-retard position. In the shown embodiment, when the valve timing of the intake valve is kept at a predetermined intermediate lock position between the maximum phase-advance position and the maximum phase-retard position, a relative rotational phase between inner rotor 21 and outer rotor 22 is held by means of intermediate lock mechanisms 34a, 34b, which are installed between inner rotor 21 and outer rotor 22.

Intermediate lock mechanism 34a is a phase-advance side intermediate lock mechanism configured to restrict a shift of inner rotor 21 in the phase-advance direction (the direction indicated by the arrow P1), whereas intermediate lock mechanism 34b is a phase-retard side intermediate lock mechanism configured to restrict a shift of inner rotor 21 in the phase-retard direction (the direction indicated by the arrow P2). Also, in the shown embodiment, the phase-advance side intermediate lock mechanism 34a and the phase-retard side intermediate lock mechanism 34b are configured similarly to each other.

Phase-advance side intermediate lock mechanism 34a is mainly constructed by a lock key 35a, a lock key accommodation chamber 36a, a coil spring 37a, and an engaging recessed portion 38a. The lock key serves as an elongated intermediate-position holding member, which is configured to advance or retreat in the direction perpendicular to the rotation axis common to inner rotor 21 and outer rotor 22. The lock key accommodation chamber is formed in the protruding portion 25 of outer rotor 22. The coil spring is located in the lock key accommodation chamber 36a for permanently biasing the lock key 35a toward the inner rotor 21. The engaging recessed portion is formed on the outer periphery of inner rotor 21 and configured to be brought into engagement with the top end of lock key 35a. Phase-advance side intermediate lock mechanism 34a is configured to restrict a shift of the relative rotational phase between inner rotor 21 and outer rotor 22 from the predetermined intermediate phase to the phase-advance side by bringing the top end of lock key 35a into engagement with the engaging recessed portion 38a at the intermediate lock position. By the way, working fluid can be supplied into the engaging recessed portion 38a through an oil passage 40a formed in the inner rotor 21. Also, working fluid in the engaging recessed portion 38a can be drained (exhausted) through the oil passage 40a.

As previously discussed, phase-retard side intermediate lock mechanism 34b is configured similarly to phase-advance side intermediate lock mechanism 34a. Phase-retard side intermediate lock mechanism 34b is mainly constructed by a lock key 35b, a lock key accommodation chamber 36b, a coil spring 37b, and an engaging recessed portion 38b. The lock key serves as an elongated intermediate-position holding member, which is configured to advance or retreat in the direction perpendicular to the rotation axis common to inner rotor 21 and outer rotor 22. The lock key accommodation chamber is formed in the protruding portion 25 of outer rotor 22. The coil spring is located in the lock key accommodation chamber 36b for permanently biasing the lock key 35b toward the inner rotor 21. The engaging recessed portion is formed on the outer periphery of inner rotor 21 and configured to be brought into engagement with the top end of lock key 35b. Phase-retard side intermediate lock mechanism 34b is configured to restrict a shift of the relative rotational phase between inner rotor 21 and outer rotor 22 from the predetermined intermediate phase to the phase-retard side by bringing the top end of lock key 35b into engagement with the engaging recessed portion 38b at the intermediate lock position. By the way, working fluid can be supplied into the engaging recessed portion 38b through an oil passage 40b formed in the inner rotor 21. Also, working fluid in the engaging recessed portion 38b can be drained (exhausted) through the oil passage 40b.

That is, restricting a shift of the relative rotational phase between inner rotor 21 and outer rotor 22 from the predetermined intermediate phase by means of the intermediate lock mechanisms 34a, 34b, enables valve timing of the intake valve to be held at the intermediate lock position.

Variable valve timing mechanism 2 is driven by working fluid from an oil pump 41. Oil pump 41 is driven mechanically by a rotational force of the crankshaft so as to draw working fluid in an oil pan 42. The working fluid is supplied from the oil pump 41 to both an oil control valve (OCV) 43 and an oil switching valve (OSV) 44. Oil control valve 43 and oil switching valve 44 are control valves, which are duty-controlled based on or responsively to respective commands from an ECM (engine control module) 11.

Oil control valve 43 is configured to supply working fluid through the phase-advance side oil passage 30 to the phase-advance side hydraulic chamber 27, and also configured to supply working fluid through the phase-retard side oil passage 31 to the phase-retard side hydraulic chamber 28. Oil switching valve 44 is configured to supply working fluid from an intermediate-position holding oil passage 45 through the oil passages 40a, 40b to the engaging recessed portions 38a, 38b of intermediate lock mechanisms 34a, 34b. By the way, in the shown embodiment, oil switching valve 44 is configured to have a valve structure similar to the oil control valve 43, but differing from the oil control valve in that a port, which port is brought into fluid-communication with the phase-advance side oil passage 30 during a phase-advance period, is permanently sealed.

ECM 11 is configured to receive detected signals from a variety of sensors, such as a crank angle sensor 12 for detecting a rotation angle of the crankshaft, a cam angle sensor for detecting a rotation angle of the intake camshaft, and the like, so as to sequentially update and calculate a desired value of valve timing of the intake valve based on an engine operating condition, grasped by the detection results of these sensors. ECM 11 is also configured to output a command signal to the oil control valve 43 responsively to the engine operating condition, so as to perform switching control of oil control valve 43. When valve timing of the intake valve is advanced, oil control valve 43 is switched so as to supply working fluid into the phase-advance side hydraulic chamber 27. Conversely when valve timing of the intake valve is retarded, oil control valve 43 is switched so as to supply working fluid into the phase-retard side hydraulic chamber 28. By the way, the valve timing of the intake valve, which is variably controlled by the variable valve timing mechanism 2, can be detected, based on output signals from crank angle sensor 12 and cam angle sensor 13, by means of the ECM 11.

Figure 2:
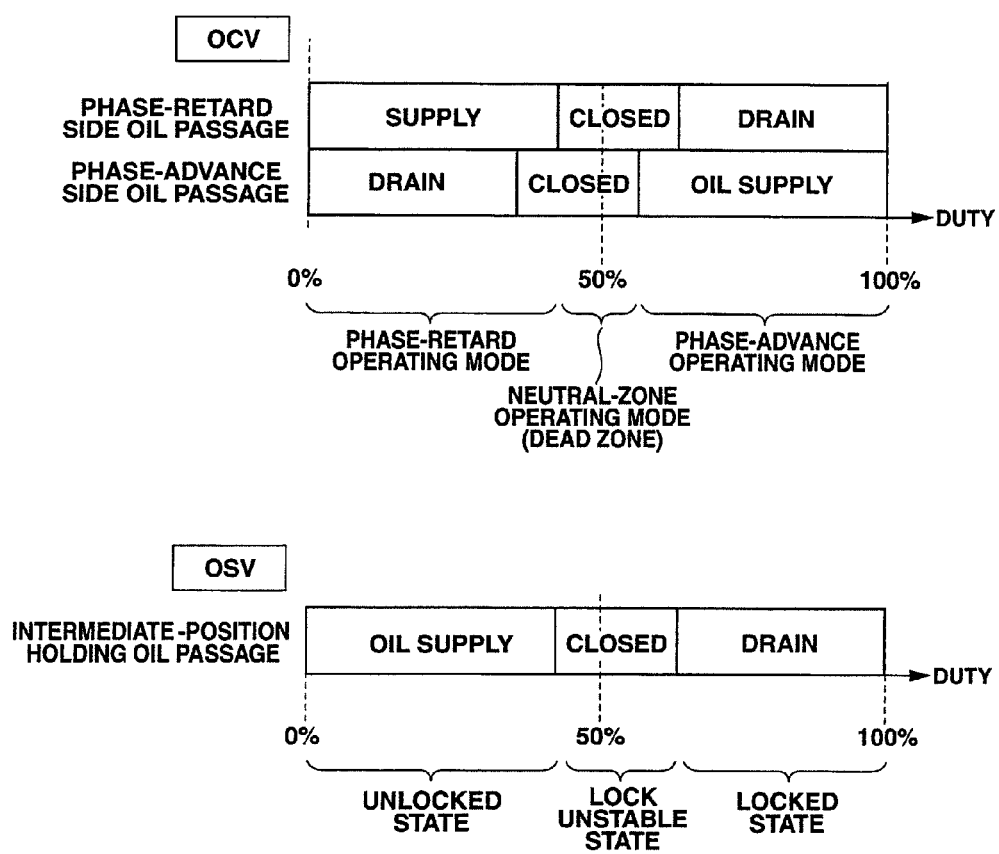
FIG. 2 is an explanatory view schematically illustrating operating states of an oil control valve and an oil switching valve with respect to a duty ratio.

Referring to FIG. 2, there is shown the explanatory view schematically illustrating the operating states of oil control valve 43 and oil switching valve 44 with respect to a duty ratio, which is a control command value.

The operating state of oil control valve 43 is mainly classified into a phase-advance operating mode at which valve timing of the intake valve is advanced, a neutral-zone operating mode (a dead zone) that working-fluid supply to both the phase-advance side hydraulic chamber 27 and the phase-retard side hydraulic chamber 28 is not executed, and a phase-retard operating mode at which valve timing of the intake valve is retarded. During the phase-advance operating mode, working fluid is supplied to the phase-advance side hydraulic chamber 27, whereas working fluid in the phase-retard side hydraulic chamber 28 is drained (exhausted). Thus, valve timing of the intake valve is changed to the phase-advance side. During the phase-retard operating mode, working fluid is supplied to the phase-retard side hydraulic chamber 28, whereas working fluid in the phase-advance side hydraulic chamber 27 is drained (exhausted). Thus, valve timing of the intake valve is changed to the phase-retard side. During the neutral-zone operating mode, working-fluid supply to the phase-advance side hydraulic chamber 27 and the phase-retard side hydraulic chamber 28 and working-fluid drainage (exhaust) from the phase-advance side hydraulic chamber and the phase-retard side hydraulic chamber are stopped. Hence, there is no phase-change of valve timing of the intake valve to the phase-advance side or to the phase-retard side, and thus the valve timing of the intake valve can be held in the current valve-timing state.

The operating state of oil switching valve 44 is mainly classified into a locked state where valve timing of the intake valve can be held at the intermediate lock position, an unlocked state where valve timing of the intake valve cannot be held at the intermediate lock position, and a lock unstable state (lock indefinite state) that waits to be confirmed whether the intermediate lock mechanisms are put in the locked state or in the unlocked state.

In the previously-discussed locked state, working-fluid supply to the engaging recessed portions 38a, 38b is stopped, and working fluid in the engaging recessed portions 38a, 38b is drained (exhausted). Hence, a state that enables the top ends of lock keys 35a, 35b to advance into respective engaging recessed portions 38a, 38b, becomes established. Immediately when valve timing of the intake valve has reached the intermediate lock position, the top ends of lock keys 35a, 35b are brought into engagement with respective engaging recessed portions 38a, 38b, thereby enabling the valve timing of the intake valve to be held at the intermediate lock position.

In the previously-discussed unlocked state, working fluid is simultaneously supplied into both of the engaging recessed portions 38a, 38b, with the result that hydraulic pressures, which are greater than spring biases (spring forces) of coil springs 37a, 37b acting on respective lock keys 35a, 35b, occur in the engaging recessed portions 38a, 38b. Hence, a state that disables the top ends of lock keys 35a, 35b to advance into respective engaging recessed portions 38a, 38b, becomes established. Even when valve timing of the intake valve has reached the intermediate lock position, the valve timing of the intake valve cannot be held at the intermediate lock position, and thus the intermediate lock by intermediate lock mechanisms 34a, 34b is released.

In the previously-discussed lock unstable state, a state that inhibits working-fluid supply into the engaging recessed portions 38a, 38b and working-fluid drainage (exhaust) from the engaging recessed portions becomes established. Hydraulic pressures in the engaging recessed portions 38a, 38b are held at pressure levels (in hydraulic-pressure states) immediately before a transition to the lock unstable state. Therefore, there are two cases, one being the case that the top ends of lock keys 35a, 35b are brought into engagement with respective engaging recessed portions 38a, 38b, and the other being the case that the top ends of lock keys 35a, 35b are not brought into engagement with respective engaging recessed portions 38a, 38b.

In the variable valve timing mechanism 2 having the construction as discussed above, when the engine revolution speed (NE) increases, there is a possibility that a centrifugal force, acting on each of lock keys 35a, 35b of intermediate lock mechanisms 34a, 34b, also increases. Therefore, when mechanically holding the valve timing of the intake valve at the intermediate lock position by means of intermediate lock mechanisms 34a, 34b, lock keys 35a, 35b tend to retreat back to the outer-rotor side in accordance with an increase in engine revolution speed. Hence, there is a possibility that the top ends of lock keys 35a, 35b cannot be brought into engagement with the associated engaging recessed portions 38a, 38b.

In the embodiment, in the presence of an intermediate lock demand that the valve timing of the intake valve needs to be in the intermediate lock position, basically, forced lock control is executed such that the valve timing of the intake valve is shifted to the phase-advance side or to the phase-retard side with respect to the intermediate lock position under a state where the valve timing of the intake valve has been mechanically held at the intermediate lock position by means of intermediate lock mechanisms 34a, 34b. Hereupon, the previously-discussed intermediate lock demand occurs, for instance when water temperature or oil temperature becomes lower than or equal to a predetermined temperature or when engine revolution speed becomes less than or equal to a predetermined revolution speed.

Concretely, in the case of the forced lock control of the embodiment, under a state where the valve timing of the intake valve has been mechanically held at the intermediate lock position by means of intermediate lock mechanisms 34a, 34b, variable valve timing mechanism 2 is open-loop controlled (feedforward-controlled) such that the valve timing of the intake valve is brought to the maximum phase-retard position, and oil switching valve 44 is controlled to the locked state. Thus, regarding the phase-retard side lock mechanism 34b, a part of the top end of lock key 35b is pushed against the engaging recessed portion 38b, while a part of the back end of lock key 35b is pushed against the lock key accommodation chamber 36b. Owing to frictional forces between frictional-contact portions of the lock key pushed against the engaging recessed portion 38b and the lock key accommodation chamber 36b, movement of lock key 35b in the direction perpendicular to the rotation axis common to inner rotor 21 and outer rotor 22 can be restricted.

Accordingly, it is possible to reduce the influence of the centrifugal force acting on the lock key 35b, and thus it is possible to suppress disengagement of lock key 35b from both of the inner rotor 21 and the outer rotor 22, that is, sliding-movement of lock key 35b out of engagement with the engaging recessed portion 38b.

By the way, in the forced lock control, assuming that variable valve timing mechanism 2 is open-loop controlled such that the valve timing of the intake valve is brought to the maximum phase-advance position, regarding the phase-advance side lock mechanism 34a, a part of the top end of lock key 35a is pushed against the engaging recessed portion 38a, while a part of the back end of lock key 35a is pushed against the lock key accommodation chamber 36a. Owing to frictional forces between frictional-contact portions of the lock key pushed against the engaging recessed portion 38a and the lock key accommodation chamber 36a, it is possible to suppress sliding-movement of lock key 35a out of engagement with the engaging recessed portion 38a.

However, during the forced lock control, in the event that mechanical holding by intermediate lock mechanisms 34a, 34b has been erroneously released, open-loop control of the valve timing of the intake valve to the maximum phase-retard position is superior to open-loop control of the valve timing of the intake valve to the maximum phase-advance position, because of a reduced deterioration degree of exhaust-emission performance and a reduced deterioration degree of driving performance.

By the way, there is a limit to the frictional force produced by execution of the previously-discussed forced lock control. When the engine revolution speed increases and thus the centrifugal force, acting on the lock key 35b, exceeds a lock-key engagement holding force, determined by the frictional force and the spring bias (spring force) of coil spring 37b, there is a possibility that lock key 35b slides out of the engaging recessed portion 38b even during execution of the forced lock control. Hereupon, the aforementioned lock-key engagement holding force is a force, acting on the lock key, in the direction opposite to the direction of action of the centrifugal force, acting on the lock key.

Therefore, in the embodiment, in the presence of an intermediate lock demand that the valve timing of the intake valve needs to be in the intermediate lock position, switching among controls for holding valve timing of variable valve timing mechanism 2 at the intermediate lock position occurs depending on the up-to-date information about the current engine revolution speed.

When the valve timing of the intake valve is held at the intermediate lock position and the engine revolution speed becomes greater than a predetermined first engine revolution speed R1 (for example, 5500 rpm), intermediate position feedback control is executed. Hereupon, in the shown embodiment, the first engine revolution speed R1 is an engine-speed threshold value at which the centrifugal force acting on the lock key 35b becomes greater than the lock-key engagement holding force produced during forced lock control.

In the intermediate position feedback control, the valve timing of the intake valve is feedback-controlled to the intermediate lock position, which is set as a desired value, and oil switching valve 44 is controlled to the unlocked state.

By the way, the intermediate position feedback control is continuously executed, until such time that the engine revolution speed becomes less than or equal to a predetermined second engine revolution speed R2 (for example, 3000 rpm) less than the first engine revolution speed R1. Immediately when the engine revolution speed becomes less than or equal to the second engine revolution speed R2, switching to forced lock control occurs. Hereupon, in the shown embodiment, the second engine revolution speed R2 is an engine-speed threshold value at which the centrifugal force acting on the lock key 35b becomes greater than the spring bias of coil spring 37b acting on the lock key 35b.

When the valve timing of the intake valve is held at the intermediate lock position, the engine revolution speed is less than or equal to the first engine revolution speed R1, and intermediate position feedback control is inactive, forced lock control comes into active.

When the valve timing of the intake valve is not held at the intermediate lock position and the engine revolution speed is less than the second engine revolution speed R2, return-to-intermediate-position control comes into active. In the return-to-intermediate-position control, open-loop control is executed such that the valve timing of the intake valve is brought to the intermediate lock position, and oil switching valve 44 is controlled to the locked state.

By the way, when the valve timing of the intake valve is not held at the intermediate lock position and the engine revolution speed is greater than the second engine revolution speed R2, the previously-discussed intermediate position feedback control comes into active.

Figure 3:
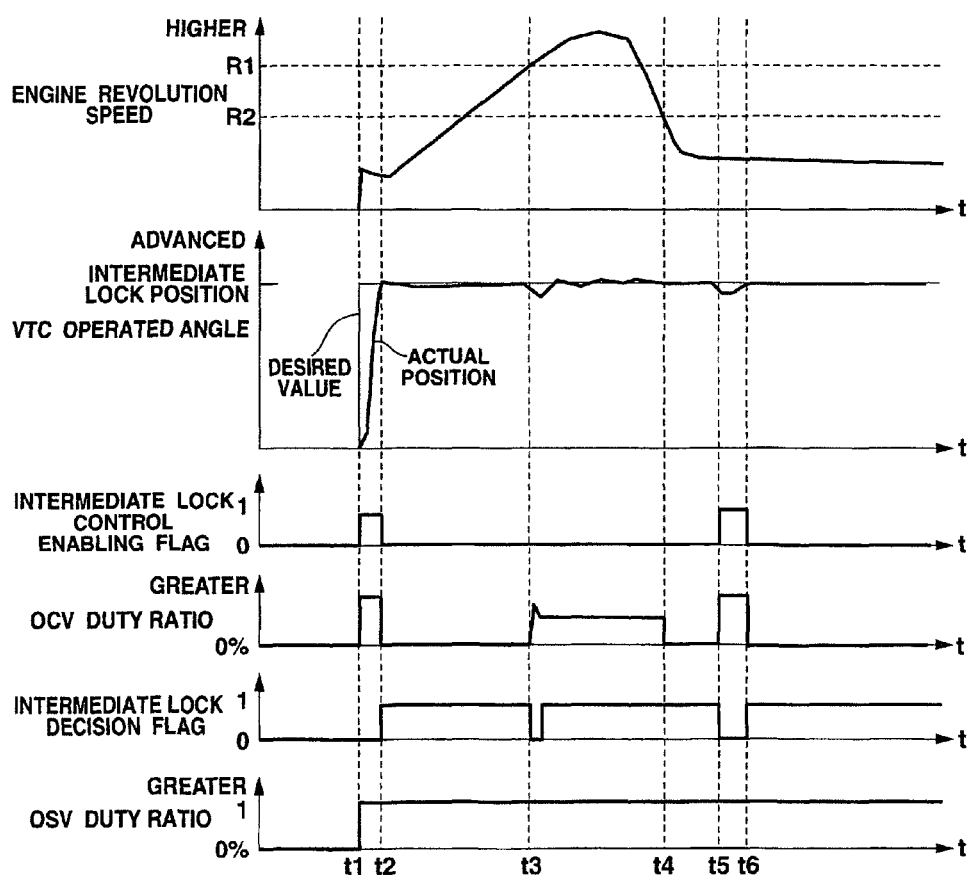
FIG. 3 is a timing chart illustrating one example of operation of the variable valve timing mechanism in the embodiment.

Referring to FIG. 3, there is shown the timing chart illustrating one example of operation of variable valve timing mechanism 2 in the embodiment. By the way, in FIG. 3, after the internal combustion engine has been started (that is, from the time t1), suppose that the intermediate lock demand as discussed previously is continuously occurring.

At the time t1, the internal combustion engine is started up, and thus the intermediate lock demand occurs. At this time, the valve timing of the intake valve (i.e., VTC operated angle) is not yet brought to the intermediate lock position which is set as a desired value, and thus an intermediate lock control enabling flag becomes set to "1". The intermediate lock control enabling flag becomes set to "1", when the engine revolution speed is less than the second engine revolution speed R2 and the actual valve timing of the intake valve deviates from the intermediate lock position to the phase-advance side or to the phase-retard side by a predetermined value or more under a state where a desired value of valve timing of the intake valve is set to the intermediate lock position.

Hence, the operating state of oil control valve 43 is controlled so as to establish the phase-advance operating mode, until such time that the valve timing of the intake valve has reached the intermediate lock position, which is set as a desired value (i.e., during the time period t1-t2). From the time t1, the operating state of oil switching valve 44 is controlled so as to establish the locked state, since the intermediate lock demand occurs. That is, in the presence of the intermediate lock demand, during the time period t1-t2 during which the intermediate lock control enabling flag is set to "1", the previously-discussed return-to-intermediate-position control is executed. By the way, the time period t1-t2 is a startup period of the internal combustion engine, and thus the return-to-intermediate-position control executed during this time period corresponds to startup intermediate lock control that the valve timing of the intake valve is brought to the intermediate lock position for the purpose of ensuring a start stability of the internal combustion engine.

At the time t2, immediately when the valve timing of the intake valve reaches the intermediate lock position, the intermediate lock control enabling flag becomes reset to "0", whereas an intermediate lock decision flag is set to "1". The intermediate lock decision flag becomes reset to "0", when the actual valve timing of the intake valve deviates from the intermediate lock position to the phase-advance side or to the phase-retard side by a predetermined value or more under a state where a desired value of valve timing of the intake valve is set to the intermediate lock position.

Also, at the time t2, the intermediate lock demand occurs, and the intermediate lock decision flag is set to "1", and the engine revolution speed is less than or equal to the first engine revolution speed R1, forced lock control is initiated.

At the time t3, the engine revolution speed reaches the first engine revolution speed R1. At this point of time, assume that the lock key 35b of phase-retard side intermediate lock mechanism 34b is pulled out of the engaging recessed portion 38b owing to a centrifugal force, and thus the valve timing of the intake valve deviates from the intermediate lock position to the phase-retard side. As a result, the intermediate lock decision flag becomes reset to "0".

Hence, from the time t3, in order to maintain the valve timing of the intake valve at the intermediate lock position, intermediate position feedback control is executed instead of the forced lock control.

Accordingly, even under an operating condition that the valve timing of the intake valve cannot be held at the intermediate lock position by the use of intermediate lock mechanisms 34a, 34b owing to an increase in engine revolution speed, it is possible to maintain the valve timing of the intake valve at the intermediate lock position by virtue of the intermediate position feedback control.

That is, in the presence of a demand that the valve timing of the intake valve needs to be in the intermediate lock position, it is possible to maintain the valve timing of the intake valve at the intermediate lock position regardless of the magnitude of engine revolution speed by properly using forced lock control and intermediate position feedback control depending on the engine revolution speed.

At the time t4, immediately when the engine revolution speed becomes less than the second engine revolution speed R2, forced lock control is executed instead of the intermediate position feedback control.

As discussed above, the engine revolution speed, at which the control mode is switched from intermediate position feedback control to forced lock control, is set to the second engine revolution speed R2. Hence, when switching to the forced lock control occurs, the centrifugal force, acting on each of lock keys 35a, 35b of intermediate lock mechanisms 34a, 34b, becomes small, and thus a state where the top ends of lock keys 35a, 35b have been certainly advanced into the associated engaging recessed portions 38a, 38b becomes established.

Therefore, in a period of transition from intermediate position feedback control to forced lock control, it is possible to certainly maintain the valve timing of the intake valve at the intermediate lock position.

At the time t5, suppose that, during the forced lock control, lock keys 35a, 35b of intermediate lock mechanisms 34a, 34b slide out of engagement with respective engaging recessed portions 38a, 38b. At this time, the intermediate lock control enabling flag becomes set to "1", while the intermediate lock decision flag becomes rest to "0". Hence, at the time t5, the forced lock control is terminated. Also, the operating state of oil control valve 43 is controlled so as to establish the phase-advance operating mode, until such time that the valve timing of the intake valve has reached the intermediate lock position, which is set as a desired value (i.e., during the time period t5-t6). That is, in the presence of the intermediate lock demand, during the time period t5-t6 during which the intermediate lock control enabling flag is set to "1", the previously-discussed return-to-intermediate-position control is executed.

Accordingly, in the case that, during the forced lock control, lock keys 35a, 35b of intermediate lock mechanisms 34a, 34b slide out of engagement with respective engaging recessed portions 38a, 38b, and thus the valve timing of the intake valve cannot be held at the intermediate lock position by the use of intermediate lock mechanisms 34a, 34b, the forced lock control is terminated, while return-to-intermediate-position control is initiated. Hence, it is possible to return the valve timing of the intake valve to the intermediate lock position.

In the case that the condition for the intermediate lock demand becomes unsatisfied under a state where the valve timing of the intake valve is held at the intermediate lock position, lock keys 35a, 35b of intermediate lock mechanisms 34a, 34b have to be slid out of engagement with respective engaging recessed portions 38a, 38b. At this time, assuming that the hydraulic pressure in the phase-advance side hydraulic chamber 27 and the hydraulic pressure in the phase-retard side hydraulic chamber 28 do not equalize with each other, one of lock keys 35a, 35b is pushed against the sidewall of the associated engaging recessed portion 38 and the sidewall of the associated lock key accommodation chamber 36. Thus, there is a possibility that the one lock key 35, pushed against the sidewalls, cannot be satisfactorily pulled out of the engaging recessed portion 38. That is, there is a possibility that a failure in the release of the intermediate lock by intermediate lock mechanisms 34a, 34b occurs.

Therefore, in the shown embodiment, in the case that the condition for the intermediate lock demand becomes unsatisfied under a state where the valve timing of the intake valve is held at the intermediate lock position by means of intermediate lock mechanisms 34a, 34b, intermediate lock release control is executed. According to the intermediate lock release control, hydraulic pressure is supplied to the phase-advance side hydraulic chamber 27 and the phase-retard side hydraulic chamber 28 in turn, such that the hydraulic pressure in the phase-advance side hydraulic chamber 27 and the hydraulic pressure in the phase-retard side hydraulic chamber 28 are balanced to each other, and then the operating state of oil switching valve 44 is switched to an unlocked state.

Hence, it is possible to smoothly pull the top ends of lock keys 35a, 35b out of respective engaging recessed portions 38a, 38b, thereby reducing the probability of a failure in the release of the intermediate lock of intermediate lock mechanisms 34a, 34b.

After a predetermined time has elapsed from switching of the operating state of oil switching valve 44 to the unlocked state, oil control valve 43 is operated so as to bring the valve timing of the intake valve to a desired value. At this time, in the case that the valve timing of the intake valve does not shift from the intermediate lock position even by operation of oil control valve 43, it is determined that a failure in the release of the intermediate lock by intermediate lock mechanisms 34a, 34*b* occurs. In such a case, the operation of oil control valve 43 for bringing the valve timing of the intake valve to the desired value is stopped, and then the previously-discussed intermediate lock release control is executed again.

Hence, the valve timing of the intake valve passes through the intermediate lock position several times, and thus it is possible to pull the top ends of lock keys 35*a*, 35*b* out of respective engaging recessed portions 38*a*, 38*b*. Also, in a state where a failure in the release of the intermediate lock by intermediate lock mechanisms 34*a*, 34*b* has occurred, the valve timing of the intake valve cannot be controlled to a desired value except the intermediate lock position. Thus, it is possible to avoid an unnecessary shearing stress from acting on the lock keys 35*a*, 35*b* owing to relative rotation between inner rotor 21 and outer rotor 22.

Figure 4:
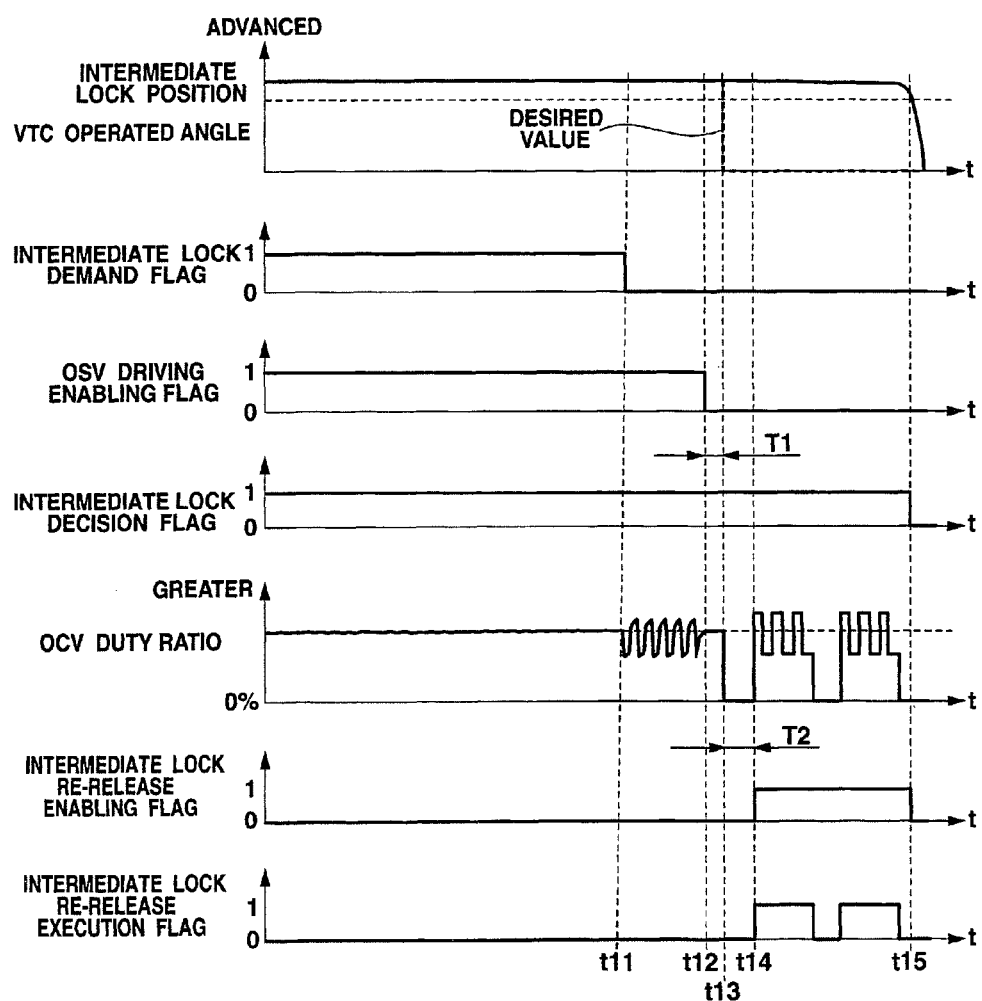
FIG. 4 is a timing chart illustrating another example of operation of the variable valve timing mechanism in the embodiment.

Referring to FIG. 4, there is shown the timing chart illustrating another example of operation of variable valve timing mechanism 2 in the embodiment, showing a situation that the intermediate lock demand disappears under a state where the valve timing of the intake valve (i.e., VTC operated angle) is held at the intermediate lock position mechanically by means of intermediate lock mechanism 34*a*, 34*b*.

At the time t11, the intermediate lock demand disappears and thus the intermediate lock demand flag becomes reset to "0". Hence, oil control valve 43 is operated to supply hydraulic pressure to the phase-advance side hydraulic chamber 27 and the phase-retard side hydraulic chamber 28 several times in turn, such that the hydraulic pressure in the phase-advance side hydraulic chamber 27 and the hydraulic pressure in the phase-retard side hydraulic chamber 28 are balanced to each other.

At the time t12 when hydraulic-pressure supply alternately to the phase-advance side hydraulic chamber 27 and the phase-retard side hydraulic chamber 28 has been completed, an OSV driving enabling flag is reset to "0" so as to shift the oil switching valve 44 to the unlocked state. The OSV driving enabling flag becomes set to "1", when shifting the oil switching valve 44 to the locked state.

At the time t13 when a predetermined time T1 has elapsed from the time t12, it is determined that releasing of the intermediate lock by intermediate lock mechanisms 34*a*, 34*b* has been successfully achieved, and thus the desired value of valve timing of the intake valve is changed to a position of the phase-retard side with respect to the intermediate lock position, and the operating state of oil control valve 43 is controlled so as to establish the phase-retard operating mode.

The predetermined time T1 is set, fully taking account of a response speed of variable valve timing mechanism 2. Normally, intermediate lock mechanisms 34*a*, 34*b* become unlocked states (an intermediate lock release state) during the time period from the time t12 to the time t13. However, in the case of the example of FIG. 4, a failure in the release of the intermediate lock by intermediate lock mechanisms 34*a*, 34*b* occurs during the time period from the time t12 to the time t13. Thus, even when the desired value of valve timing of the intake valve is changed at the time t13, the valve timing of the intake valve is successively held at the intermediate lock position.

Therefore, even at the time t14 when a predetermined time T2 has elapsed from the time when it has been determined that releasing of the intermediate lock by intermediate lock mechanisms 34*a*, 34*b* has been successfully achieved, the valve timing of the intake valve remains kept at the intermediate lock position.

For the reasons discussed above, at the time t14, a predetermined intermediate lock re-release permission condition is satisfied and thus an intermediate lock re-release enabling flag becomes set to "1". The intermediate lock re-release permission condition becomes satisfied, for instance when the intermediate lock decision flag is set to "1" at the point of time when the predetermined time T2 has elapsed from the time when it has been determined that releasing of the intermediate lock by intermediate lock mechanisms 34*a*, 34*b* has been successfully achieved.

As seen in FIG. 4, at the time t14, the intermediate lock re-release enabling flag becomes set to "1", and thus an intermediate lock re-release execution flag becomes set to "1". Hence, executed is intermediate lock re-release control in which oil control valve 43 is operated to supply hydraulic pressure to the phase-advance side hydraulic chamber 27 and the phase-retard side hydraulic chamber 28 several times in turn, such that the hydraulic pressure in the phase-advance side hydraulic chamber 27 and the hydraulic pressure in the phase-retard side hydraulic chamber 28 are balanced to each other. The intermediate lock re-release control practically has the same control content as the intermediate lock release control.

The intermediate lock re-release control is executed until such time that the intermediate lock re-release enabling flag becomes reset to "0". In the example shown in FIG. 4, at the time t15 after the intermediate lock re-release control has been executed two times, the detected value of valve timing of the intake valve becomes a value outside of an intermediate lock decision region and thus the intermediate lock re-release enabling flag becomes reset to "0".

By the way, when learning a reference position of valve timing of variable valve timing mechanism 2, the learning accuracy of a reference position of valve timing can be improved by learning during forced lock control in which the valve timing of the intake valve is mechanically held at the intermediate lock position by means of intermediate lock mechanisms 34*a*, 34*b*. As a result, the accuracy of valve timing during intermediate position feedback control can be enhanced and thus it is possible to more certainly bring lock keys 35*a*, 35*b* into engagement with respective engaging recessed portions 38*a*, 38*b* in a period of transition from intermediate position feedback control to forced lock control. Hence, it is possible to more certainly maintain the valve timing of the intake valve at the intermediate lock position.

Figure 5:
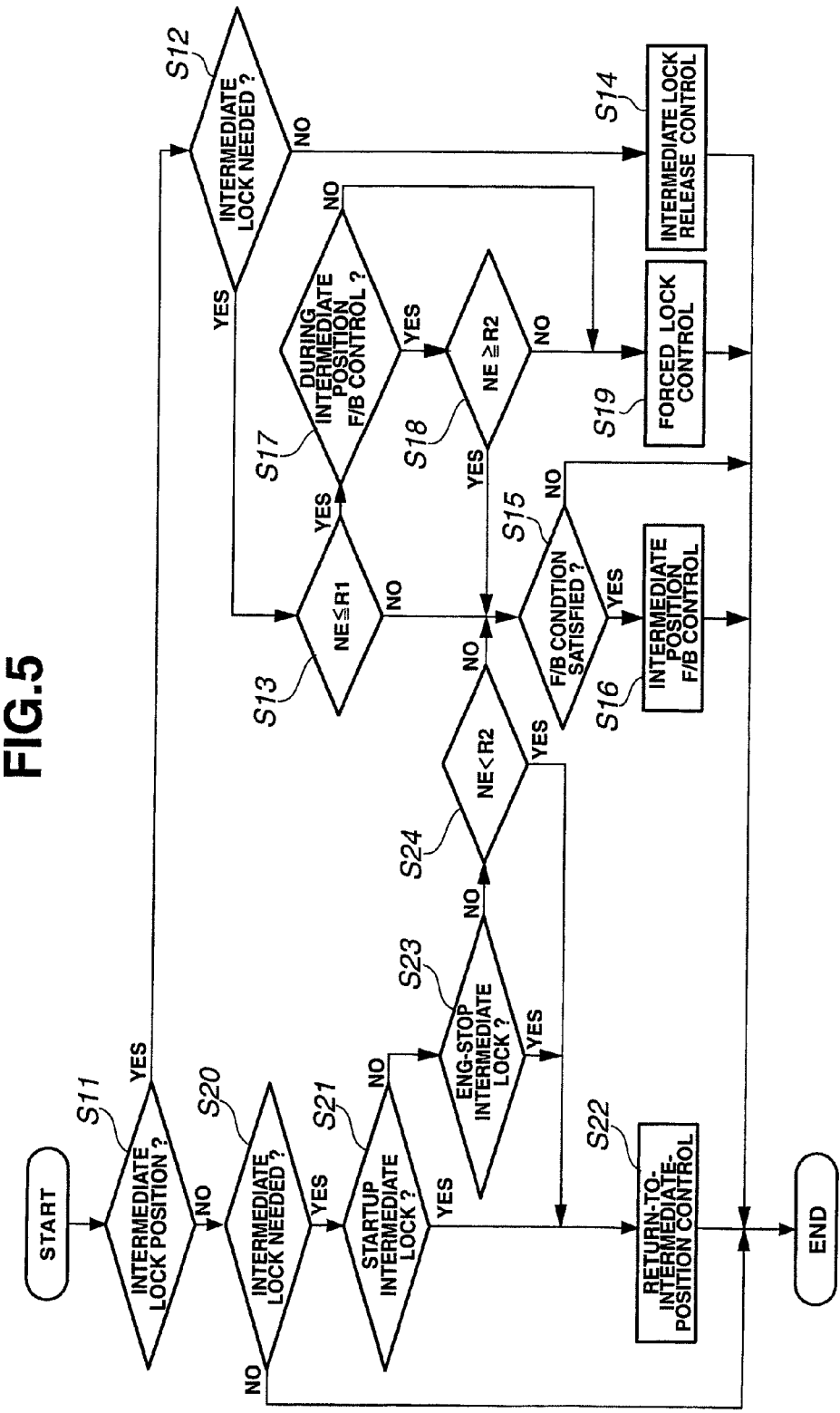
FIG. 5 is a flowchart illustrating a control flow in the embodiment.

Referring to FIG. 5, there is shown the flowchart illustrating a control flow in the embodiment. At step S11, a check is made to determine whether the valve timing of the intake valve is at an intermediate lock position. When the valve timing is at the intermediate lock position, the routine proceeds to step S12. Conversely when the valve timing is out of the intermediate lock position, the routine proceeds to step S20.

At step S12, a check for the presence or absence of an intermediate lock demand is made. In the presence of the intermediate lock demand, the routine proceeds to step S13. Conversely in the absence of the intermediate lock demand, the routine proceeds to step S14 so as to execute the previously-discussed intermediate lock release control.

At step S13, a check is made to determine whether the engine revolution speed is less than or equal to the first engine revolution speed R1. When the engine revolution speed is less than or equal to the first engine revolution speed R1, the routine proceeds to step S17. If not so, the routine proceeds to step S15.

At step S15, a check is made to determine whether a predetermined feedback condition is satisfied. Hereupon, the feedback condition becomes satisfied, for instance when water temperature or oil temperature becomes lower than or equal to a predetermined temperature (for example, 110° C.).

When it is determined that the predetermined feedback condition has been satisfied through step S15, the routine proceeds to step S16 so as to execute intermediate position feedback control.

At step S17, a check is made to determine whether the intermediate position feedback control is active or inactive. When the intermediate position feedback control is active, the routine proceeds to step S18. Conversely when the intermediate position feedback control is inactive, the routine proceeds to step S19 so as to execute the previously-discussed forced lock control.

At step S18, a check is made to determine whether the engine revolution speed is greater than or equal to the second engine revolution speed R2. When the engine revolution speed is greater than or equal to the second engine revolution speed R2, the routine proceeds to step S15. If not so, the routine proceeds to step S19.

At step S20, a check for the presence or absence of the intermediate lock demand is made. In the presence of the intermediate lock demand, the routine proceeds to step S21. Conversely in the absence of the intermediate lock demand, the current routine terminates.

At step S21, a check is made to determine whether the valve timing of the intake valve is controlled to the intermediate lock position owing to a startup of the internal combustion engine. When the valve timing of the intake valve is controlled to the intermediate lock position owing to a startup of the internal combustion engine, the routine proceeds to step S22. If not so, the routine proceeds to step S23. For instance, in the presence of turn-on operation of an engine key by the driver, it is determined that the valve timing is controlled to the intermediate lock position owing to a startup of the internal combustion engine.

At step S22, the previously-discussed return-to-intermediate-position control is executed.

At step S23, a check is made to determine whether the valve timing of the intake valve is controlled to the intermediate lock position owing to a stop of the internal combustion engine. When the valve timing of the intake valve is controlled to the intermediate lock position owing to a stop of the internal combustion engine, the routine proceeds to step S22. If not so, the routine proceeds to step S24. For instance, in the presence of turn-off operation of the engine key by the driver, it is determined that the valve timing is controlled to the intermediate lock position owing to a stop of the internal combustion engine.

At step S24, a check is made to determine whether the engine revolution speed is less than the second engine revolution speed R2. When the engine revolution speed is less than the second engine revolution speed R2, the routine proceeds to step S22. If not so, the routine proceeds to step S15.

Figure 6:
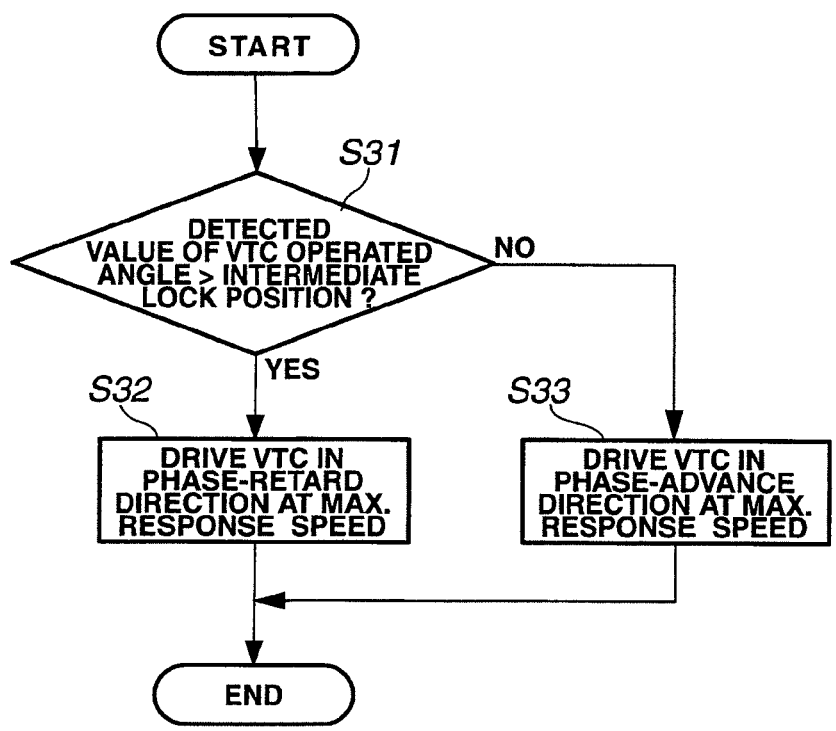
FIG. 6 is a flowchart illustrating return-to-intermediate-position control.

Hereunder described in detail is the return-to-intermediate-position control executed at step S22. Referring to FIG. 6, there is shown the flowchart illustrating a control flow of the return-to-intermediate-position control.

At step S31, the detected value of valve timing of the intake valve (i.e., the detected value of VTC operated angle) is compared to the intermediate lock position. When the detected value of valve timing of the intake valve exists on the phase-advance side with respect to the intermediate lock position, the routine proceeds to step S32. Conversely when the detected value of valve timing of the intake valve exists on the phase-retard side with respect to the intermediate lock position, the routine proceeds to step S33.

At step S32, variable valve timing mechanism 2 is driven toward the phase-retard side at a maximum response speed.

At step S33, variable valve timing mechanism 2 is driven toward the phase-advance side at a maximum response speed.

Accordingly, even when the intermediate lock by intermediate lock mechanisms 34*a*, 34*b* has been unexpectedly released in the presence of the intermediate lock demand, it is possible to return the valve timing of the intake valve to the intermediate lock position as soon as possible.

By the way, in the shown embodiment, at each of steps S32, S33, variable valve timing mechanism 2 is driven at the maximum response speed. However, depending on the situation, the response speed may be varied so as not to drive the variable valve timing mechanism 2 at the maximum response speed.

For instance, suppose that the internal combustion engine has stopped with the variable valve timing mechanism 2 driven toward the phase-retard side by return-to-intermediate-position control for returning to the intermediate lock position. In such a case, due to an engine revolution speed decrease, the hydraulic pressure, serving as a drive source for variable valve timing mechanism 2, also tends to drop. Thus, the valve timing of the intake valve shifts to the phase-retard side.

Therefore, in the case that the valve timing of the intake valve is controlled to the intermediate lock position owing to a stop of the internal combustion engine, in executing the previously-discussed return-to-intermediate-position control, the response speed, at which the valve timing of the intake valve is operated to the phase-retard side, may be set to a response speed slower than the maximum response speed.

As a situation for returning to the intermediate lock position by operating the valve timing of the intake valve to the phase-retard side by return-to-intermediate-position control, two cases (two situations) can be taken into account.

Case 1: The valve timing of the intake valve immediately after the top ends of lock keys 35*a*, 35*b* and the engaging recessed portions 38*a*, 38*b* have been disengaged from each other exists on the phase-retard side with respect to the intermediate lock position, and thus the valve timing of the intake valve is operating toward the phase-advance side. Thereafter, however, the valve timing of the intake valve has shifted to the phase-advance side with respect to the intermediate lock position without engaging the top ends of lock keys 35*a*, 35*b* with respective engaging recessed portions 38*a*, 38*b* at the intermediate lock position.

Case 2: The valve timing of the intake valve immediately after the top ends of lock keys 35*a*, 35*b* and the engaging recessed portions 38*a*, 38*b* have been disengaged from each other exists on the phase-advance side with respect to the intermediate lock position, from the beginning.

For instance, suppose that the valve timing of the intake valve is not held at the intermediate lock position mechanically by means of intermediate lock mechanisms 34*a*, 34*b*, even though the valve timing of the intake valve has to be mechanically held at the intermediate lock position by means of intermediate lock mechanisms 34*a*, 34*b* during a stop of the internal combustion engine, caused by turn-off operation of the engine key by the driver. In such a case, as soon as a predetermined time (for example, one second) has elapsed from the turn-off operation of the engine key, the internal combustion engine stops for preventing the driver from feeling discomfort. With the internal combustion engine put in a stop state, the hydraulic pressure, serving as a drive source for variable valve timing mechanism 2, tends to drop, and thus the valve timing of the intake valve shifts to the phase-retard side.

That is to say, suppose that the internal combustion engine stops during return-to-intermediate-position control and the valve timing of the intake valve immediately after the engine has stopped exists on the phase-advance side with respect to the intermediate lock position. In such a case, during stopping of the internal combustion engine, owing to an engine revolution speed decrease the valve timing of the intake valve shifts to the phase-retard side. Therefore, in the case that the valve timing of the intake valve exists on the phase-advance side with respect to the intermediate lock position, there are few advantages of returning to the phase-retard side at the maximum response speed.

By the way, suppose that the response speed, at which the valve timing of the intake valve is operated to the phase-retard side during return-to-intermediate-position control, is too slow. In this case, it takes a long time before the valve timing of the intake valve reaches the intermediate lock position. Accordingly, the extent to which the response speed should be set slower than the maximum response speed has to be appropriately tuned, fully taking account of both the previously-discussed two cases, namely, Case 1 and Case 2.

The invention claimed is:

1. A variable valve timing control device for an internal combustion engine comprising:
   a variable valve timing mechanism having a first rotor adapted to rotate together with a camshaft and a second rotor arranged coaxially with the first rotor and adapted to rotate together with a crankshaft, and configured to variably control valve timing of an engine valve by changing a relative rotational phase between the first rotor and the second rotor depending on an operating condition; and
   an intermediate lock mechanism having an intermediate-position holding member configured to advance or retreat in a direction perpendicular to a rotation axis common to the first rotor and the second rotor and enable the valve timing of the engine valve to be held at a predetermined intermediate lock position between a maximum phase-advance position and a maximum phase-retard position by engagement with the first rotor and the second rotor,
   wherein feedback control is executed such that the valve timing of the engine valve is brought to the intermediate lock position when an engine revolution speed is greater than a first engine revolution speed even under a condition that permits the intermediate-position holding member to be engaged.

2. A variable valve timing control device for an internal combustion engine as recited in claim 1, wherein:
   when the engine revolution speed is less than or equal to the first engine revolution speed and the first rotor and the second rotor are engaged with each other by the intermediate lock mechanism in the presence of a demand that the valve timing of the engine valve needs to be in the intermediate lock position, the feedback control terminates, while forced lock control, in which the intermediate position holding member is pushed against both the first rotor and the second rotor by operating the variable valve timing mechanism such that the relative rotational phase between the first rotor and the second rotor is shifted to a phase-advance side or a phase-retard side, is executed.

3. A variable valve timing control device for an internal combustion engine as recited in claim 1, wherein:
   the first engine revolution speed is set, taking account of a centrifugal force acting on the intermediate position holding member and frictional forces produced between the intermediate position holding member and each of the first rotor and the second rotor by the forced lock control.

4. A variable valve timing control device for an internal combustion engine as recited in claim 1, wherein:
   when the engine revolution speed becomes less than or equal to the first engine revolution speed during the feedback control, the feedback control is continuously executed until such time that the engine revolution speed reaches a second engine revolution speed, the second engine revolution speed being set, taking account of a centrifugal force acting on the intermediate position holding member.

5. A variable valve timing control device for an internal combustion engine as recited in claim 2, wherein:
   when, during the forced lock control, the intermediate position holding member moves out of engagement with the first rotor and the second rotor and thus the valve timing of the engine valve deviates from the intermediate lock position, the forced lock control terminates, while return-to-intermediate-position control that returns the valve timing of the engine valve to the intermediate lock position is executed.

6. A variable valve timing control device for an internal combustion engine as recited in claim 5, wherein:
   a control section of the return-to-intermediate-position control is configured to:
   determine whether up-to-date valve timing of the engine valve exists on the phase-advance side or the phase-retard side with respect to the intermediate lock position,
   return to the intermediate lock position by operating the variable valve timing mechanism at a maximum response speed toward the phase-retard side, when the up-to-date valve timing exists on the phase-advance side, and
   return to the intermediate lock position by operating the variable valve timing mechanism at the maximum response speed toward the phase-advance side, conversely when the up-to-date valve timing exists on the phase-retard side.

7. A variable valve timing control device for an internal combustion engine as recited in claim 5, wherein:
   a control section of the return-to-intermediate-position control is configured to:
   determine whether up-to-date valve timing of the engine valve exists on the phase-advance side or the phase-retard side with respect to the intermediate lock position,
   return to the intermediate lock position by operating the variable valve timing mechanism at a maximum response speed toward the phase-advance side, when the up-to-date valve timing exists on the phase-retard side, and
   return to the intermediate lock position by operating the variable valve timing mechanism at a response speed slower than the maximum response speed toward the phase-retard side, conversely when the up-to-date valve timing exists on the phase-advance side.

8. A variable valve timing control device for an internal combustion engine as recited in claim 5, wherein:
   learning of a reference position of the valve timing of the variable valve timing mechanism is executed during the forced lock control.

9. A variable valve timing control device for an internal combustion engine as recited in claim 1, wherein:
   the variable valve timing mechanism is configured to change the relative rotational phase between the first rotor and the second rotor by supplying working fluid to one of a phase-advance chamber and a phase-retard chamber defined between the first rotor and the second rotor and by draining the working fluid from the other of the phase-advance chamber and the phase-retard chamber; and when a demand that the valve timing of the engine valve needs to be in the intermediate lock position disappears with the intermediate position holding member engaged with the first rotor and the second rotor, hydraulic pressure is supplied equally to the phase-advance chamber and the phase-retard chamber before the intermediate position holding member moves out of engagement with the first rotor and the second rotor.

\* \* \* \* \*